United States Patent

Suzuki

[11] Patent Number: 5,929,602
[45] Date of Patent: Jul. 27, 1999

[54] CONTROLLED BATTERY CHARGER FOR CHARGING MULTIPLE BATTERIES

[75] Inventor: Keiji Suzuki, Fujisawa, Japan

[73] Assignee: International Business Machines Corporation, Armonk, N.Y.

[21] Appl. No.: 09/120,159

[22] Filed: Jul. 21, 1998

Related U.S. Application Data

[63] Continuation of application No. 08/908,633, Aug. 7, 1997.

[30] Foreign Application Priority Data

Sep. 12, 1996 [JP] Japan ................................. 8-241551

[51] Int. Cl.$^6$ .................................................. H01M 10/46
[52] U.S. Cl. ........................................... 320/116; 320/160
[58] Field of Search ................................... 320/116, 123, 320/125, 137, 139, 160, 163, 165

[56] References Cited

U.S. PATENT DOCUMENTS 5,483,144  1/1996  Marek .

*Primary Examiner*—Edward H. Tso
*Attorney, Agent, or Firm*—Bernard D. Bogdon

[57] ABSTRACT

A controlled battery charger for appropriately executing trickle charging for an electronic apparatus incorporating more than two batteries even when output terminal voltages of the incorporated batteries differ. A battery charger of the present invention includes a trickle charging circuit serially inserted between the output terminals of the first and the second batteries. An example of the trickle charging circuit is constituted by the first zener diode whose cathode is connected to the output terminal of the first battery, and the second zener diode whose cathode is connected to the output terminal of the second battery and whose anode is connected to the anode of the first zener diode, i.e., is constituted by two zener diodes serially connected in opposing directions. A resistor may be serially inserted between the anodes of the first and the second zener diodes. When the gap between the output terminal voltages Vbat1 and Vbat2 of the first and the second batteries becomes larger than the first or the second zener voltage Vz1 or Vz2, the trickle charging circuit enters the current-carrying state. For example, when the first battery is over-discharged and the gap between the output terminal voltages Vbat1 and Vbat2 is greater than the second zener voltage Vz2, the output terminals enter the current-carrying states, and a current flows from the second battery to the first battery until the gap of the voltage level is equal to or lower than the zener voltage Vz2. As a result, trickle charging for the first battery is performed by the second battery. The resistor inserted serially between the first and the second zener diodes controls the current volume that flows between the batteries in the current-carrying state into a microcurrent appropriate for trickle charging.

6 Claims, 4 Drawing Sheets

CONTROLLED BATTERY CHARGER FOR CHARGING MULTIPLE BATTERIES

This application is a continuation of application Ser. No. 08/908,633, filed Aug. 7, 1997, titled "Controlled Battery Charger For Charging Multiple Batteries", still pending.

FIELD OF THE INVENTION

The invention relates to a controller and a battery charger for a battery-operated electronic apparatus; and in particular to a battery charger controlled for executing a trickle charging of an incorporated battery. More specifically, the present invention pertains to a controller and a battery charger for appropriately executing a trickle charging operation for an electronic apparatus incorporating more than two batteries or more.

BACKGROUND OF THE INVENTION

In accordance with recent developments in technology, various types of personal computers (hereinafter also referred to as "PCs"), such as desktop and notebook types, have been produced and are being sold on the market. Among these PCs are compact and light notebook PCs that are designed and produced while taking into consideration their suitability for use in mobile environments, i.e., their portability and their adequacy for outdoor use.

One of the features of a notebook PC is a "battery-operated type," i.e., it can be driven not only by a commercially available power source but also by an incorporated battery. This is because a notebook PC is so designed that it can be used in a place, such as outdoors or at a destination on a business trip, where a commercially available power source may not always be available for employment. The incorporated battery is generally a "battery pack," consisting of a package containing a plurality of cells. Rechargeable batteries, such as Li-Ion or NiMH, are used for the battery cells.

The capacity of a battery incorporated in a PC is limited, and the battery operating life is typically two to three hours. Therefore, various ideas have been proposed for extending the battery operating life. The technique employed for the so-called "power management" process is the best example of a method for extending battery operating life. The battery operating life can also be easily extended by increasing the number of cells in a battery pack, or by employing battery cells having a high energy density, such as Li-Ion battery cells.

Recently, a PC for which two battery packs can be provided, i.e., a "dual battery" PC, has been developed. A dual battery computer system is disclosed, for example, in Japanese Patent Application No. Hei 6-174387 (Japanese Unexamined Patent Publication No. Hei 8-54967), which was assigned to the present assignee. The "IBM ThinkPad 760E/760ED" ("ThinkPad" is a trademark of IBM Corp.), sold by IBM Japan, Ltd., is so structured that an auxiliary battery pack (also called a "second battery") can be replaced with another device, such as an FDD or a CD-ROM drive. A system having two battery packs will have a battery operating life twice that of a system having only one battery pack.

FIG. 3 is a schematic diagram illustrating the hardware block of a power supply system in a dual battery computer system. In FIG. 3, the power supply system includes not only a commercially available power source (an AC power source), but also two battery packs 10 and 20 that function as power sources. The voltage provided by the AC power source is converted into a DC voltage by an AC adaptor 40, and is input to a DC/DC converter 50 in the system. The output terminals of the battery packs 10 and 20 are parallelly connected to the DC/DC converter 50 with the output of the AC adaptor 40. The AC adaptor 40, the battery packs 10 and 20 can be removed from a system main body 100 and can be replaced with others. The DC/DC converter 50 regulates the AC adapter output voltage or the battery output voltage to an appropriate voltage level for driving a system load 60, and distributes the current to the respective loads in a system 60. The loads include a CPU 61, a main memory 62, a peripheral controller chip 63, such as a video controller, a liquid crystal display (LCD)/backlight unit 64, and a hard disk drive (HDD) 65.

To supply power to the system 60, generally, an AC power source that is regarded as having an endless capacity is employed. In other words, only when power is not supplied from the AC power source, i.e., when the AC adaptor 40 is not inserted into the AC power source, power is supplied by the battery packs 10 and 20, i.e., the discharging of the battery packs 10 and 20 is performed. Extra power supplied by the AC power source is employed to charge the battery packs 10 and 20. The charging/discharging of the battery packs 10 and 20 can be controlled by turning on/off analog switches 11 and 21 on the output lines of the battery packs 10 and 20. The analog switches 11 and 21 are operated by a charging/discharging controller 67 via control signals A and B. The charging/discharging controller 67 can detect the charging start/end time and the discharging start/end time for the battery packs 10 and 20 by, for example, measuring the output terminal voltages of the battery packs 10 and 20 and their ambient temperatures, or by adding the charge current or discharge current, which is generally well known in the art.

The charging cycle for a rechargeable battery generally includes a quick charge mode and a trickle charge mode. The quick charge mode is a mode for charging a battery, during a period immediately following the discharging of the battery, at a relatively high speed (i.e., with a large current) until it is almost fully charged by using a power source with constant current or constant voltage characteristics. The trickle charge is a mode for executing charging by using a microcurrent at a relatively low speed. One of the effects of trickle charging is that charging is performed with a microcurrent long enough to supplement a self-discharge during a period continuing until an almost fully charged battery is fully charged, so that, to the extent possible, deterioration of the battery can be prevented, even when the charging is performed for an extended period of time. The other effect of trickle charging is that an over-discharged battery can recover to a state wherein quick charging can be performed (hereinafter referred to as a "normal discharge state"). If quick charging is executed for a battery in an over-discharged state, deterioration of the battery's feature will occur. Recently, trickle charging is often performed in anticipation of the benefit conferred by the second effect mentioned above.

In a battery operated electronic apparatus, a charging/discharging controller (or a circuit having an equivalent function) monitors the charging/discharging feature of a battery pack and controls the charging/discharging operation.

FIG. 4 is a diagram illustrating the structure for monitoring the charging/discharging feature of a battery pack. The output voltage of the battery pack is extracted by an amplifier 81 parallelly connected to positive terminal T1. The ambient temperature of the battery pack is measured by a thermistor 82 provided in the periphery of the battery cell. One terminal of the thermistor 82 is connected to negative terminal T2 of the battery pack (i.e., it is grounded), and a voltage level at the other terminal indicates a value relative to the ambient temperature. The output current of the battery pack is obtained by a differential amplifier 83 and a resistor 84. The resistor 84, which is serially connected with the negative terminal of the battery pack, generates a voltage by a value equivalent to the output current, and the differential amplifier 83 amplifies the voltage and extracts the resultant voltage.

The output terminal voltage of the battery pack generally indicates a value relative to the remaining capacity of the battery. The temperature of the battery cell fluctuates in accordance with the charging/discharging process. The total of the electric charges that have flowed in or flowed out of the battery pack can be obtained by adding a charge current or a discharge current. Therefore, when the charging/discharging controller 67 monitors at least one of the outputs T3, T4 and T5 from the amplifier 81, the thermistor 82 and the differential amplifier 83, it can acquire the charge remaining on the battery pack and the charging state (well known).

The measurement electronic components 81, 82, 83 and 84 are, for example, provided in the battery pack, or are mounted on a printed circuit board near the battery pack in the electronic apparatus.

In the dual battery electronic apparatus shown in FIG. 3, when the charging/discharging controller 67 monitors the charging/discharging feature, i.e., one of the output terminal voltages, an output current value and an ambient temperature, for the respective battery packs 10 and 20, an adequate charging/discharging operation can be performed for each of the battery packs 10 and 20. For example, when the battery pack 10 is in an over-discharged state and the battery pack 20 is in a normal discharged state, trickle charging can be performed for the battery pack 10, and quick charging can be performed for the battery pack 20.

From the view point of power source management, monitoring and controlling the charging/discharging for each battery pack is very preferable. However, although it is possible for a high-end type apparatus, which has the electronic components for measuring an output terminal voltage, to obtain an output current value and an ambient temperature that are provided for each battery pack, this is difficult for a low-end type apparatus. Furthermore, the provisions for monitoring terminals T3, T4 and T5, in addition to electrode terminals T1 and T2, are difficult to include in the design of an apparatus, or are accompanied by an increase in the manufacturing costs.

If it can be premised that the battery packs 10 and 20 are almost equally charged and discharged, and the output terminal voltages of both battery packs 10 and 20 do not substantially differ, it is not necessary for the charging/discharging feature be monitored for the respective battery packs 10 and 20 described above, and monitoring the feature only at one position will be sufficient. For example, only when a voltage level is measured at a point P, where the output terminals of both battery packs are collected (see FIG. 3), is the charging/discharging feature for both battery packs 10 and 20 obtained. However, actually it is difficult to equally charge and discharge the battery packs 10 and 20, and the output terminal voltages of the two, i.e., their remaining capacities, tends to differ. Even when the voltage level at the point P in FIG. 3 indicates a normal discharged state, such an event as that the battery pack 10 is in an over-discharged state and the battery pack 20 is in a normal discharged state occurs relatively easily. Especially for battery packs that can be replaced, an unbalanced condition between the terminal voltages easily occurs. If quick charging is performed for the battery packs 10 and 20 in a condition where their discharged states are not uniform, deterioration of the performance of the over-discharged battery pack 10 will occur. When trickle charging is performed for both battery packs, the charging period will be increased.

To resolve the above shortcomings, it is one object of the present invention to provide a superior battery charger for a battery operated electronic apparatus, and to provide an electronic apparatus having a superior charging function.

It is another object of the present invention to provide a superior battery charger for executing trickle charging for a battery incorporated in a battery operated electronic apparatus, and to provide an electronic apparatus having a superior charging function.

It is an additional object of the present invention to provide a superior battery charger for appropriately executing trickle charging for an electronic apparatus incorporating two batteries or more, and to provide an electronic apparatus having a superior charging function.

It is a further object of the present invention to provide a superior battery charger for appropriately executing trickle charging for an electronic apparatus incorporating two batteries or more even when output terminal voltages of the incorporated batteries differ, and to provide an electronic apparatus having a superior charging function.

SUMMARY OF THE INVENTION

To seek achieving the above objects, according to a first aspect of the present invention, provided is a battery charger for an electronic apparatus having a first and a second battery, comprises: means for, being inserted between the output terminals of the first and the second battery, entering current-carrying state only when the gap of the terminal voltage level between the batteries becomes larger than a predetermined value.

According to a second aspect of the present invention, a battery charger for an electronic apparatus having a first and a second battery, comprises: (a) a first trickle charging circuit, serially inserted between output terminals of the first and the second battery, for entering current-carrying state only when the output terminal voltage of the first battery is larger by a predetermined value than the output terminal voltage of the second battery; and (b) a second trickle charging circuit, serially inserted between output terminals of the first and the second battery, for entering current-carrying state only when the output terminal voltage of the second battery is larger by a predetermined value than the output terminal voltage of the first battery.

According to a third aspect of the present invention, a battery charger for an electronic apparatus having a first and a second battery, comprises: (a) a first trickle charging circuit, serially inserted between output terminals of the first and the second battery, for entering current-carrying state only when the output terminal voltage of the first battery is larger by a predetermined value than the output terminal voltage of the second battery; (b) a second trickle charging circuit, serially inserted between output terminals of the first and the second battery, for entering current-carrying state only when the output terminal voltage of the second battery is larger by a predetermined value than the output terminal voltage of the first battery; and (c) a voltage converter, serially inserted between output terminals of the first and the second battery, for converting a passing current into a predetermined voltage level.

According to a fourth aspect of the present invention, provided is a battery charger for an electronic apparatus having a first and a second battery, comprises: means for, being serially inserted between output terminals of the first and the second battery, being constituted by two zener diodes, the anodes of which are connected together.

According to a fifth aspect of the present invention, a battery charger for an electronic apparatus having a first and a second battery, comprises: (a) a first zener diode, the cathode of the first zener diode being connected to the output terminal of the first battery; and (b) a second zener diode, the cathode of the second zener diode being connected to the output terminal of the second battery and the anode of the second zener diode being connected to the anode of the first zener diode.

According to a sixth aspect of the present invention, a battery charger for an electronic apparatus having a first and a second battery, comprises: (a) a first a zener diode, the cathode of the first zener diode being connected to the output terminal of the first battery; (b) a second zener diode, the cathode of the second zener diode being connected to the output terminal of the second battery; and (c) a resistor serially inserted between the anodes of the first and the second zener diodes.

According to a seventh aspect of the present invention, provided is an electronic apparatus having a charging function for a first and a second battery, comprises: means for, being inserted between the output terminals of the first and the second battery, entering current-carrying state only when the gap of the terminal voltage level between the batteries becomes larger than a predetermined value.

According to an eighth aspect of the present invention, an electronic apparatus having a charging function for a first and a second battery, comprises: (a) an AC adaptor for converting power from an AC power source into a DC voltage to supply the DC voltage; (b) a DC/DC converter for extracting an output voltage of the AC adaptor, the first or the second battery, and for converting the output voltage into a predetermined voltage and stabilizing the predetermined voltage; (c) a system load for receiving the output voltage by the DC/DC converter; (d) a charging/discharging controller for controlling charging of the first and the second batteries by the AC adaptor and discharging of the first and the second batteries; (e) a first trickle charging circuit, serially inserted between output terminals of the first and the second battery, for entering current-carrying state only when the output terminal voltage of the first battery is larger by a predetermined value than the output terminal voltage of the second battery; and (f) a second trickle charging circuit, serially inserted between output terminals of the first and the second battery, for entering current-carrying state only when the output terminal voltage of the second battery is larger by a predetermined value than the output terminal voltage of the first battery.

According to a ninth aspect of the present invention, an electronic apparatus having a charging function for a first and a second battery, comprises: (a) an AC adaptor for converting power from an AC power source into a DC voltage to supply the DC voltage; (b) a DC/DC converter for extracting an output-voltage of the AC adaptor, the first or the second battery, and for converting the output voltage into a predetermined voltage and stabilizing the predetermined voltage; (c) a system load for receiving the output voltage by the DC/DC converter; (d) a charging/discharging controller for controlling charging of the first and the second batteries by the AC adaptor and discharging of the first and the second batteries; (e) a first trickle charging circuit, serially inserted between output terminals of the first and the second battery, for entering current-carrying state only when the output terminal voltage of the first battery is larger by a predetermined value than the output terminal voltage of the second battery; (f) a second trickle charging circuit, serially inserted between output terminals of the first and the second battery, for entering current-carrying state only when the output terminal voltage of the second battery is larger by a predetermined value than the output terminal voltage of the first battery; and (g) a voltage converter, serially inserted between output terminals of the first and the second battery, for converting a passing current into a predetermined voltage level.

According to a tenth aspect of the present invention, an electronic apparatus having a charging function for a first and a second battery, comprises: (a) an AC adaptor for converting power from an AC power source into a DC voltage to supply the DC voltage; (b) a DC/DC converter for extracting an output voltage of the AC adaptor, the first or the second battery, and for converting the output voltage into a predetermined voltage and stabilizing the predetermined voltage; (c) a system load for receiving the output voltage by the DC/DC converter; (d) a charging/discharging controller for controlling charging of the first and the second batteries by the AC adaptor and discharging of the first and the second batteries; and (e) a battery charger, serially inserted between output terminals of the first and the second battery, being constituted by two zener diodes, the anodes of which are connected together.

According to an eleventh aspect of the present invention, an electronic apparatus having a charging function for a first and a second battery, comprises: (a) an AC adaptor for converting power from an AC power source into a DC voltage to supply the DC voltage; (b) a DC/DC converter for extracting an output voltage of the AC adaptor, the first or the second battery, and for converting the output voltage into a predetermined voltage and stabilizing the predetermined voltage; (c) a system load for receiving the output voltage by the DC/DC converter; (d) a charging/discharging controller for controlling charging of the first and the second batteries by the AC adaptor and discharging of the first and the second batteries; (e) a first zener diode, the cathode of the first zener diode being connected to the output terminal of the first battery; and (f) a second zener diode, the cathode of the second zener diode being connected to the output terminal of the second battery and the anode of the second zener diode being connected to the anode of the first zener diode.

According to a twelfth aspect of the present invention, an electronic apparatus having a charging function for a first and a second battery, comprises: (a) an AC adaptor for converting power from an AC power source into a DC voltage to supply the DC voltage; (b) a DC/DC converter for extracting an output voltage of the AC adaptor, the first or the second battery, and for converting the output voltage into a predetermined voltage and stabilizing the predetermined voltage; (c) a system load for receiving the output voltage by the DC/DC converter; (d) a charging/discharging controller for controlling charging of the first and the second batteries by the AC adaptor and discharging of the first and the second batteries; (e) a first zener diode, the cathode of the first zener diode being connected to the output terminal of the first battery; (f) a second zener diode, the cathode of the second zener diode being connected to the output terminal of the second battery; and (g) a resistor serially inserted between the anodes of the first and the second zener diodes.

The basic and characteristic structure of the battery charger, and of the electronic apparatus having a charging function, of the present invention is that the trickle charging circuit is serially inserted between the output terminals of the first and the second batteries. A specific example of the trickle charging circuit is constituted by the first zener diode whose cathode is connected to the output terminal of the first battery, and the second zener diode whose cathode is connected to the output terminal of the second battery and whose anode is connected to the anode of the first zener diode, i.e., is constituted by two zener diodes that are serially connected in opposing directions. A resistor may be inserted serially between the anodes of the first and the second zener diodes. Upon the case in the reverse voltage that exceeds the first zener voltage Vz1 (more specifically, the sum of the first zener voltage Vz1 and the forward voltage drop Vf2 of the second zener diode; hereinafter the same principle is applied), a reverse current flows across the first zener diode. In the same manner, upon the case in the reverse voltage that exceeds the second zener voltage Vz2 (more specifically, the sum of the second zener voltage Vz2 and the forward voltage drop Vf1 of the first zener diode; hereinafter the same principle is applied), a reverse current flows across the second zener diode. The resistor between the anodes of the zener diodes controls the volume of a passing current.

When the gap between the output terminal voltages Vbat1 and Vbat2 of the first and the second batteries becomes larger than the first or the second zener voltage Vz1 or Vz2, i.e., when Vbat1−Vbat2>Vz1+Vf2, or Vbat2−Vbat1>Vz2+Vf1, the trickle charging circuit enters the current-carrying state. For example, when the first battery is over-discharged and the gap between the output terminal voltages Vbat1 and Vbat2 is greater than the second zener voltage Vz2, the output terminals enter the current-carrying states, and a current flows from the second battery to the first battery until the gap of the voltage level becomes equal to or lower than the zener voltage Vz2. As a result, trickle charging for the first battery is performed by the second battery, and the charging of the first battery is adjusted until it assumes a state where quick charging can be performed.

The resistor serially inserted between the first and the second zener diodes controls the current volume that flows between the batteries in the current-carrying state. In other words, the current volume is controlled by the resistor into a microcurrent that is appropriate for trickle charging.

The trickle charging of the present invention does not employ a commercially available power source outside the electronic apparatus, but is executed between the battery packs. Trickle charging is automatically begun by the trickle charging circuit. More specifically, trickle charging is begun when it is triggered by the gap of the voltage level between the output terminal voltages of the battery packs exceeding a predetermined value, and the monitoring of the charging/discharging feature of each battery pack and the exercising of control in accordance with the monitoring results are not required. In other words, the charging/discharging circuit in FIG. 3 does not have to be related to the trickle charging operation. Therefore, according to the present invention, a power supply circuit for a dual battery electronic apparatus can be simplified, and the structure of the trickle charging circuit can also be simplified.

For an Li-Ion battery, which is the type that is mainly used today, an overvoltage protection circuit to protect from over-charging is generally required for a trickle charging circuit that uses a commercially available power source. According to the present invention, since trickle charging is executed from one battery pack to another, an overvoltage is never applied, and thus an overvoltage protection circuit is not required.

Quick charging (trickle charging executed when both batteries are in an over-discharged state) can be executed in the conventional manner, i.e., by using a relatively large current from a commercially available power source outside the electronic apparatus.

The other objects, features, and advantages of the present invention will become apparent in due course during the detailed description of the embodiment of the present invention, which will be given while referring to the accompanying drawings.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT

Figure 1:
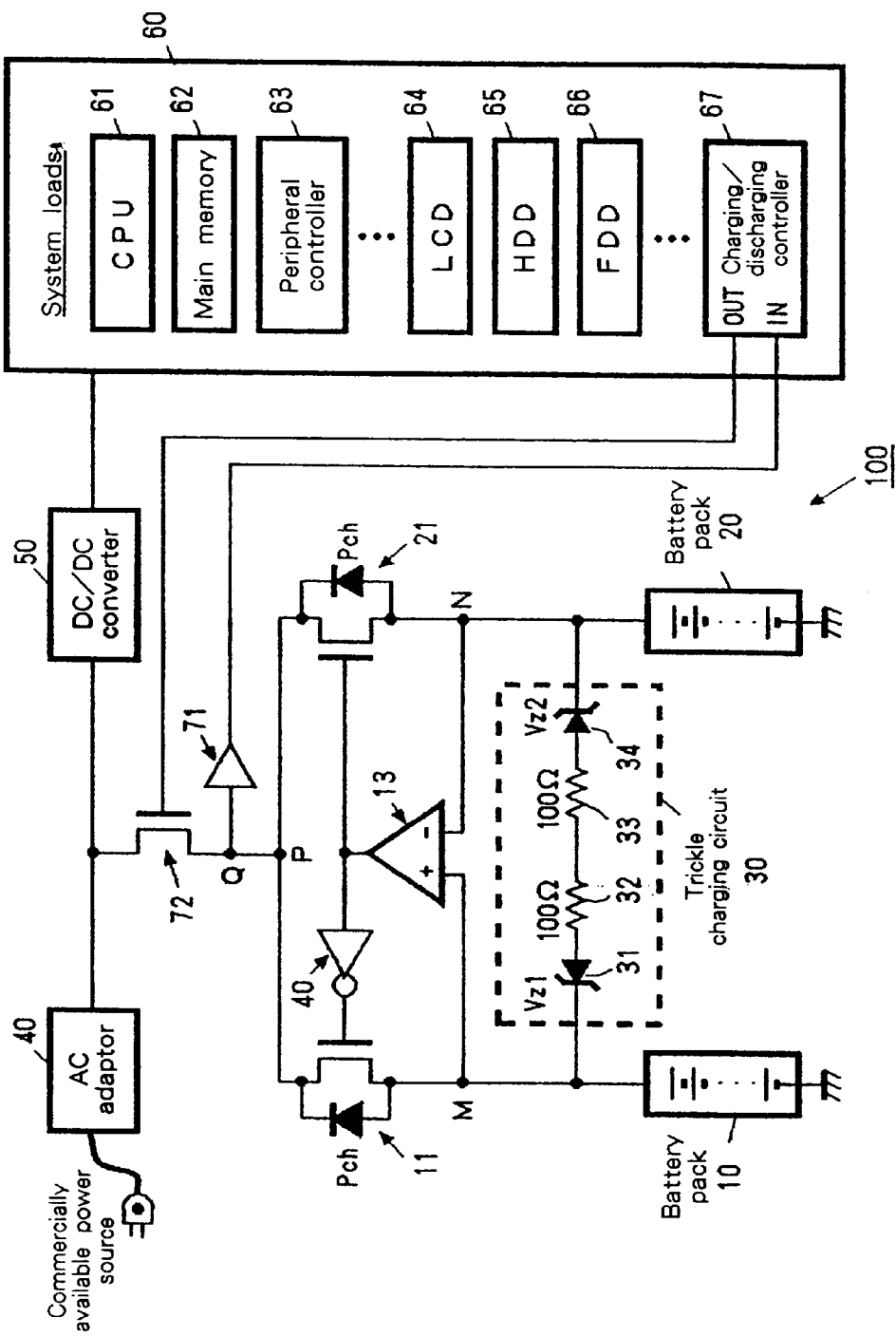
FIG. 1 is a schematic diagram illustrating a power supply system for a computer system according to the present invention.
Figure 3:
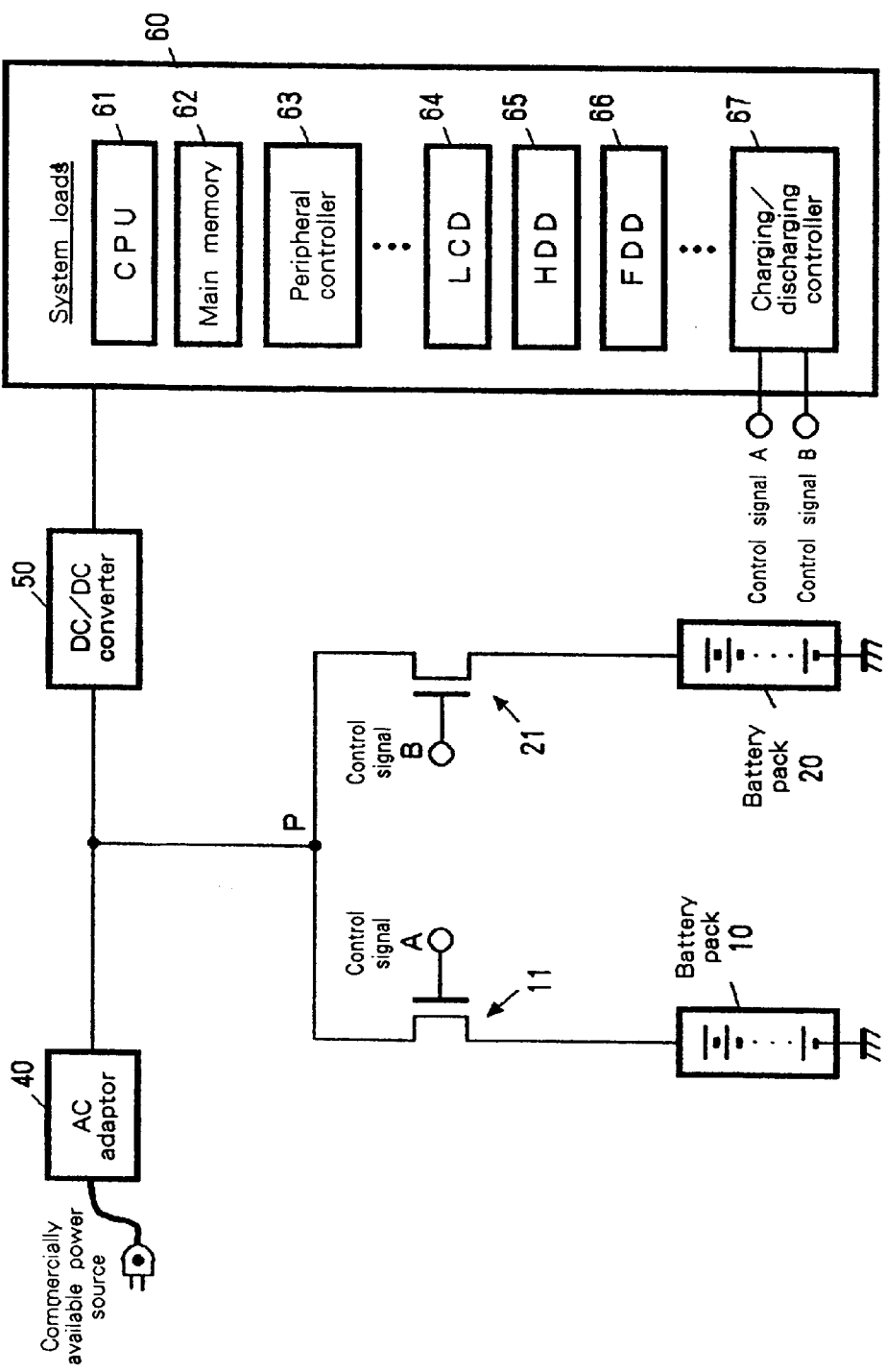
FIG. 3 is a schematic diagram illustrating the hardware block of a power supply system in a dual battery computer system.
Figure 4:
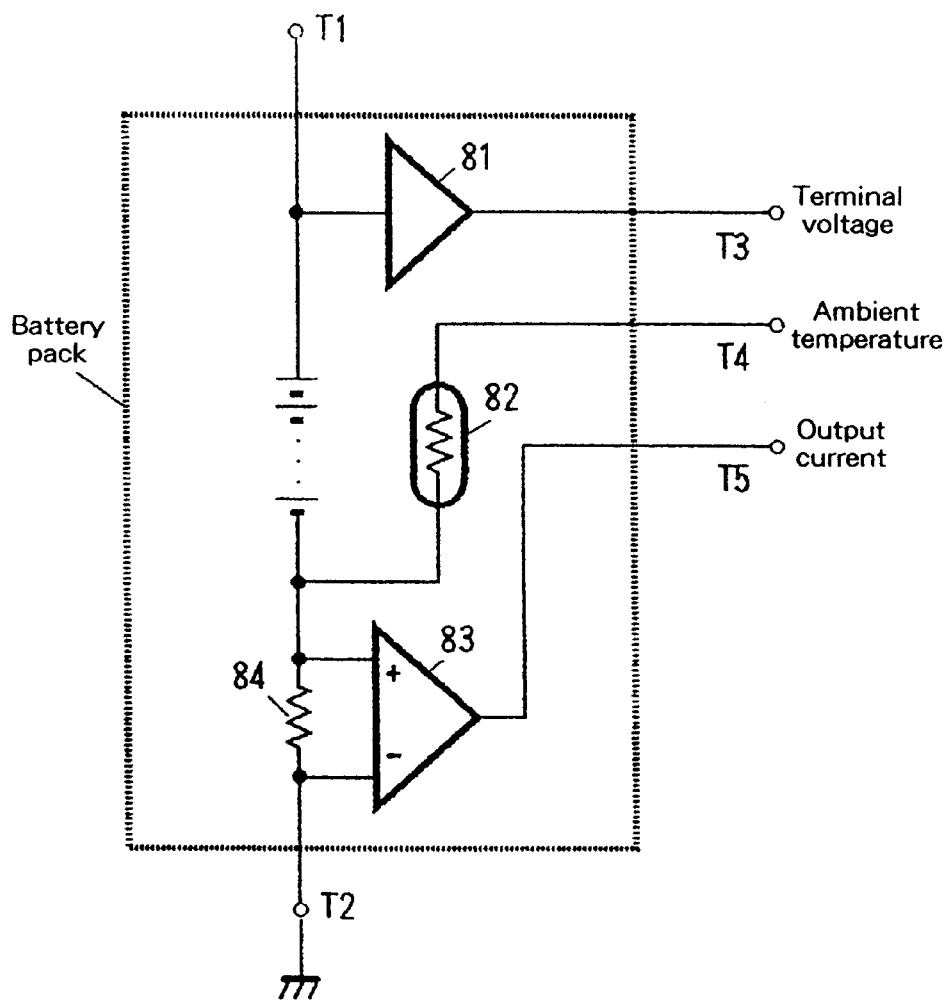
FIG. 4 is a detailed diagram illustrating the structure for monitoring a charging/discharging feature of a battery pack.

FIG. 1 is a schematic diagram illustrating a power supply system for a battery operated computer system 100 that is adequate for carrying out the present invention. The same reference numerals as are used in FIG. 3 are also used to denote corresponding and identical components in FIG. 1. As is shown in FIG. 1, the system 100 adopts a dual battery system. The respective sections will now be described.

In FIG. 1, the system 100 has as power sources two battery packs 10 and 20 in addition to a commercially available power source (AC power source). A voltage provided by the commercially available power source is converted into a DC voltage by an AC adaptor 40, and the DC voltage is input to a DC/DC converter 50 in the system 100. The output terminals of the battery packs 10 and 20 and the output line of the AC adaptor 40 are connected parallelly to the DC/DC converter 50. The AC adaptor 40 can be removed from the system 100. The battery packs 10 and 20 can also be removed from the system 100, and can be replaced with others.

The DC/DC converter 50 regulates the AC adapter 40 output voltage or the battery packs 10 and 20 output voltage to a voltage level appropriate for driving a system 60, and distributes it to the loads in the system 60. The loads include a CPU 61, a main memory 62, peripheral controller chips 63, a liquid crystal display (LCD)/backlight unit 64, a hard disk drive (HDD) 65, a floppy disk drive (FDD) 66, and a charging/discharging controller 67.

The CPU 61 is a master controller and controls all the operations of the system 100 through the execution of an operating system (OS). The main memory 62 is a storage device used for loading programs and as a work area for the CPU 61. The peripheral controller chips 63 are controller chips, such as a video controller for performing imaging on the display unit 64, and an I/O controller for controlling the input/output of serial/parallel data. The HDD 65 and the FDD 66 are so called external storage devices. The charging/discharging controller 67 provides the control logic for the control of the charging/discharging operation for the battery packs 10 and 20. The charging/discharging controller 67 has an input terminal for monitoring output voltages of the battery packs 10 and 20, and an output terminal for starting/halting the charging/discharging of the battery packs 10 and 20.

P-channel FET switches 11 and 21 are serially inserted in the respective output lines of the battery packs 10 and 20. It is preferable that the FET switches 11 and 21 be so connected that the forward directions of parasite diodes correspond to the output directions of the battery packs 10 and 20 in order to prevent the occurrence of a reverse current between the battery packs 10 and 20. The output signal of a comparator 13 is input via an inverter 14 to the gate of the FET switch 11, and the output signal of the comparator 13 is input directly to the gate of the FET switch 21. The terminal voltage signal of the battery pack 10 at point M is inputted to the positive input terminal of the comparator 13, and the terminal voltage signal of the battery pack 20 at point N is inputted to the negative input terminal of the comparator 13.

When the battery pack 10 has a larger remaining capacity, i.e. when the terminal voltage of the battery pack 10 is higher, the output of the comparator 13 goes high. As a result, the low signal is inputted to the gate of the FET switch 11 and it is turned on, while the high signal is inputted to the gate of the FET switch 12 and it is turned off. When the battery pack 20 has a larger remaining capacity, i.e., the terminal voltage of the battery pack 20 is higher, the output of the comparator 13 goes low. As a result, the high signal is inputted to the gate of the FET switch 11 and it is turned off, while the low signal is inputted to the gate of the FET switch 21 and it is turned on. That is, in accordance with the cooperative performances of the FET switches 11 and 21 and the comparator 13, the battery pack that has a larger remaining capacity is used first to supply power to the system 60 (i.e., the battery pack is discharged).

Charging/discharging control performed by the charging/discharging controller 67: The positive terminals of the battery packs 10 and 20 are merged at point P in FIG. 1 and are connected parallelly with the output line of the AC adaptor 40 to the DC/DC converter 50.

The output voltages of the battery packs 10 and 20 are extracted by a voltage detection amplifier 71 at point Q, which is located after point P where the positive terminals are merged. The charging/discharging controller 67 employs the output of the voltage detection amplifier 71 to determine, as a whole, the start/end times for charging and for discharging the battery packs 10 and 20. In other words, the charging/discharging controller 67 in this embodiment does not measure the respective output terminal voltages of the battery packs 10 and 20. Since the FET switches 11 and 21 are selectively turned on/off, only the output terminal voltage of the battery pack that has a larger remaining capacity appears at point Q. Therefore, the gap of the output terminal voltage between the battery packs 10 and 20 differs, even when one of the battery packs is in the over-discharged condition, only the output terminal voltage of the other battery pack can be detected at point Q, and the charging/discharging controller 67 does not recognize the over-discharged condition.

An analog switch 72 is serially inserted on the merged output lines for the battery packs 10 and 20. The charging/discharging controller 67 controls the ON/OFF state of the analog switch 72 in accordance with a voltage level input by the amplifier 71. In other words, the ON/OFF state of the analog switch 72 is controlled while taking into consideration only the charging/discharging state of the battery pack that is currently being used. The analog switch 72 may be a FET switch, as is shown in FIG. 1. So long as the circuit is so structured that the charging current from the AC adaptor 40 does not pass through the analog switch 72, a bipolar transistor can be used as the analog switch 72.

When the analog switch 72 is in the ON state, the charging or the discharging of the battery pack 10 or 20 is executed. More specifically, when the AC adaptor 40 is attached to the system 100 and power is supplied to the system 100 from a commercially available power source that has an infinite capacity, remaining power of the AC adaptor 40 is used for charging the battery pack 10 or 20. When the AC adaptor 40 is removed from the system 100, power is supplied to the system load 60 by either the battery pack 10 or 20. In other words, either the battery pack 10 or 20 is discharged.

When the analog switch 72 is in the OFF state, the battery pack 10 or 20 is isolated from other power sources and the system load 60, and charging and discharging are not executed.

It should especially be noted that the charging/discharging controller 67 employs only one analog switch 72 to manage the charging/discharging of the battery packs 10 and 20. That is, the charging/discharging controller 67 does not control the respective charging/discharging of the battery packs 10 and 20, so that the charging/discharging controller 67 can not execute trickle charging for only one battery pack.

As is shown in FIG. 1, the trickle charging circuit 30 is serially inserted between the positive terminals of the battery packs 10 and 20. As is shown in FIG. 1, the trickle charging circuit 30 is constituted by two zener diodes 31 and 34 that are connected serially but are oriented in opposite directions, i.e., the cathode of a first zener diode 31 is connected to the positive terminal of the battery pack 10, and the cathode of a second zener diode 34 is connected to the positive terminal of the battery pack 20, while its anode is connected to the anode of the first zener diode 31. Two resistors 32 and 33 are inserted serially between the anodes of the first and the second zener diodes 31 and 34. Zener voltages $Vz1$ and $Vz2$ for the first and the second zener diodes 31 and 34 are set to 2[V]. The resistor value for each of the resistors 32 and 33 is 100 [Ω].

Upon the case in the reverse voltage that exceeds the first zener voltage $Vz1$ (=2.5[V]) (more specifically, the sum of the first zener voltage $Vz1$ and the forward voltage drop $Vf2$ (about 0.5 V) of the second zener diode; the same principle is applied hereinafter), a reverse current flows across the first zener diode 31. Similarly, upon the case in the reverse voltage that exceeds the second zener voltage $Vz2$ (=2.5[V]) (more specifically, the sum of the second zener voltage $Vz2$ and the forward voltage drop $Vf1$ (about 0.5 V) of the first zener diode; the same principle is applied hereinafter), a reverse current flows across the second zener diode 34. Therefore, when a gap between the output terminal voltages $Vbat1$ and $Vbat2$ of the battery packs 10 and 20 becomes larger than the zener voltage $Vz1$ or $Vz2$ (=2[V]), the trickle charging circuit 30 enters the current-carrying state.

When the battery pack 10 is over-discharged, and when $Vbat2-Vbat1>Vz2+Vf1$ (=2.5[V]), the state that exists between the positive terminals enters the current-carrying state, and a current flows from the battery pack 20 to the battery pack 10 until the gap of the voltage is equal to or lower than zener voltage Vz2+voltage drop Vf1 (=2.5[V]). As a result, trickle charging of the battery pack 10 is performed using the battery pack 20, and the capacity of the battery pack 10 can recover to the point at which quick charging is enabled. In the condition where Vbat2>Vbat1, through the cooperation of the FET switches 11 and 21, and the comparator 13 and the inverter 14, only the battery pack 20 is connected to the output side and the charging/discharging controller 67 does not see the over-discharged condition of the battery pack 10. In this embodiment, since the trickle charging circuit 30 executes trickle charging independent of the charging/discharging controller 67, the charging/discharging controller 67 does not need to be aware of the over-discharged condition of the battery pack 10. Similarly, when the battery pack 20 is over-discharged and when $Vbat1-Vbat2>Vz1+Vf2$ (=2.5[V]), the state that exists between the positive terminals enters the current-carrying state, and a current flows from the battery pack 10 to the battery pack 20 until the gap of the voltage level is equal to or lower than zener voltage Vz1+voltage drop Vf2 (=2.5 [V]). As a result, trickle charging of the battery pack 20 is executed using the battery pack 10, and the capacity of the battery pack 20 can recover to the point at which quick charging is enabled. In this case also, the charging/discharging controller 67 does not need to be aware of the over-discharged condition of the battery pack 20.

The two resistors 32 and 33, which are inserted between the zener diodes 31 and 34, control the current volume flowing between the battery packs 10 and 20 in the current-carrying state. In other words, the current volume is controlled by the resistors to a microcurrent that is appropriate for trickle charging. When $Vbat2-Vbat1=5.0[V]$, for example, the passing current value is restricted to a small value of about 12.5 [mA](=(5.0−2.5)[V]÷200 [Ω]). Two resistors are employed because when one resistor malfunctions and causes a short circuit, the other resistor is available to control the current surge between the battery packs 10 and 20 caused by the short circuit and to protect the zener diodes and the battery packs 10 and 20 from overheating due to an overcurrent.

It should be fully noted that trickle charging in this embodiment is executed not by using a commercially available power source outside the system 100, but between the battery packs 10 and 20. It should also be noted that trickle charging is automatically started by the trickle charging circuit 30 and does not require any control processing by the charging/discharging controller 67. Since the charging/discharging controller 67 is not concerned with trickle charging, components and wiring for monitoring and charging/discharging control can be eliminated, and the circuit and the wiring structure of the power supply system can be simplified. In addition, the trickle charging circuit 30 is also simplified.

Many components other than those shown in FIG. 1 are required to constitute the computer system 100. However, since they are well known to one having ordinary skill in the art and do not relate to the subject of the present invention, only a general explanation for them is given in the specification.

The structure of the power supply system in the computer system 100 according to the present invention has been explained in the above sub-division. In this sub-division, the charging operation for the battery packs 10 and 20 performed by the trickle charging circuit 30 and the processing for the present invention will now be described while referring to FIG. 2.

Figure 2:
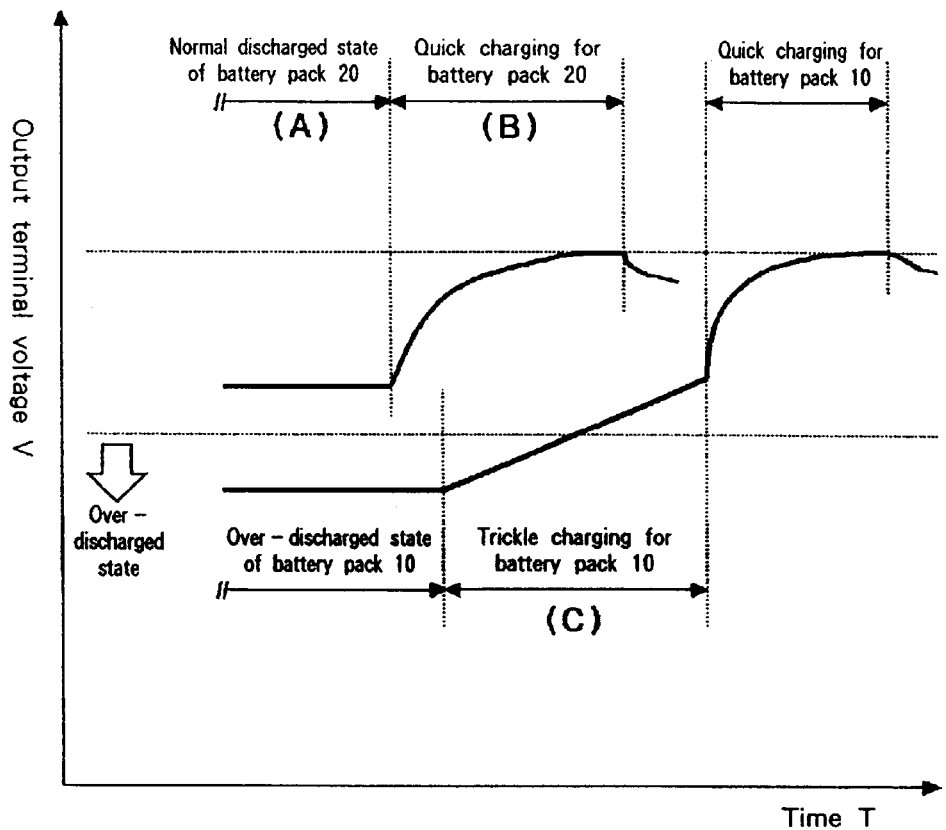
FIG. 2 is a graph showing charging characteristics of battery packs obtained by a trickle charting circuit.

In the graph in FIG. 2, it is assumed that the battery pack 10 is over-discharged and only the battery pack 20 is connected to the output side, i.e., the FET switch 11 is turned off and the FET switch 21 is turned on.

The charging/discharging controller 67 measures the output terminal voltage Vbat2 of the battery pack 20 via the voltage detection amplifier 71, and monitors the charged/discharged state of the battery pack 20. When the output terminal voltage Vbat2 falls below a predetermined value, the charging/discharging controller 67 ascertains that the battery pack 20 is in a normal discharged state ((A) in FIG. 2). The charging/discharging controller 67 engages the analog switch 72 to enable the quick charging of the battery pack 20 using remaining power by the AC adaptor 40 ((B) in FIG. 2).

As a result of the quick charging, the output terminal voltage Vbat2 is increased. When at a specific point a gap between the output terminal voltage Vbat2 and the output terminal voltage Vbat1 of the battery pack 10 exceeds the second zener voltage Vz2+ voltage drop Vf1, the trickle charging circuit 30 begins trickle charging of the battery pack 10 following the quick charging of the battery pack 20 ((C) in FIG. 2). As a result, the output terminal voltage Vbat1 is increased relatively gradually, and the battery pack 10 recovers from the over-discharged state to the normal discharged state.

As the battery packs 10 and 20 are used for the system operation, when the remaining capacities of the battery packs 10 and 20 are changed, i.e., when the values of the output terminal voltages Vbat1 and Vbat 2 are switched, only the battery pack 10 is connected to the output side, i.e., the FET switch 11 is turned on and the FET switch 21 is turned off. Then, quick charging of the battery pack 10 is executed. Since the battery pack 10 has already recovered from the over-discharged state, it will not be damaged even when it receives a relatively large charging current.

That is, since the trickle charging circuit 30 in this embodiment is provided, the charging/discharging controller 67 in the system 100 is not required to monitor the output terminal voltage of each of the battery packs 10 and 20. The charging/discharging controller 67 therefore requires fewer monitoring input terminals and charging/discharging control output terminals than does a conventional charging/discharging controller, and thus the circuit and the wiring structure of the power supply system can be simplified.

The present invention has been described in detail while referring to a specific embodiment. However, it should be obvious to one having ordinary skill in the art that various modifications or revisions of the embodiment are possible within the scope of the present invention. For example, the present invention can be applied to various cordless apparatuses that can adopt the dual battery system, such as portable radio terminals, cordless telephones, electronic notebooks and video cameras. That is, although the present invention has been disclosed by using an example, it should not be limited to that example. To fully understand the subject of the present invention, the claims should be referred to.

As is described above, according to the present invention, provided is a superior battery charger for appropriately executing trickle charging for an electronic apparatus incorporating two batteries or more, and to provide an electronic apparatus having a superior charging function.

In addition, according to the present invention, provided is a superior battery charger for appropriately executing trickle charging for an electronic apparatus incorporating more than two batteries even when output terminal voltages of the incorporated batteries differ, and to provide an electronic apparatus having a superior charging function.

That which is claimed:

1. A battery charger for an electronic apparatus having a first and a second battery, each one of the first battery and the second battery having two terminals wherein a first terminal of the two terminals of each battery is at the same potential as a correponding first terminal of the other battery, comprising: means serially inserted between a second terminal of each of the first and the second battery including two zener diodes separated by an element of resistance and wherein the anodes of which zener diodes are connected together through the element of resistance.

2. A battery charger for an electronic apparatus having a first and a second battery, each one of the first battery and the second battery having two terminals wherein a first terminal of the two terminals of each battery is at the same potential as a correponding first terminal of the other battery, comprising:
   a first zener diode, the cathode of the first zener diode being connected to the output terminal of the first battery; and
   a second zener diode, the cathode of the second zener diode being connected to the output terminal of the second battery and the anode of the second zener diode being connected to the anode of the first zener diode through an element having resistance to electrical current flow.

3. An electronic apparatus having a charging function for a first and a second battery, each one of the first battery and the second battery having two terminals wherein a first terminal of the two terminals of each battery is at the same potential as a correponding first terminal of the other battery, comprising:
   an AC adaptor for converting power from an AC power source into a DC voltage to supply the DC voltage;
   a DC/DC converter for extracting an output voltage of the AC adaptor, the first or the second battery, and for converting the output voltage into a predetermined voltage and stabilizing the predetermined voltage;
   a system load for receiving the output voltage by the DC/DC converter;
   a charging/discharging controller for controlling charging of the first and the second batteries by the AC adaptor and discharging of the first and the second batteries; and
   a battery charger, serially inserted between output terminals of the first and the second battery including two zener diodes, the anodes of which diodes are connected together through a resistor.

4. An electronic apparatus having a charging function for a first and a second battery, each one of the first battery and the second battery having two terminals wherein a first terminal of the two terminals of each battery is at the same potential as a correponding first terminal of the other battery, comprising:
   an AC adaptor for converting power from an AC power source into a DC voltage to supply the DC voltage;
   a DC/DC converter for extracting an output voltage of the AC adaptor, the first or the second battery, and for converting the output voltage into a predetermined voltage and stabilizing the predetermined voltage;
   a system load for receiving the output voltage by the DC/DC converter;
   a charging/discharging controller for controlling charging of the first and the second batteries by the AC adaptor and discharging of the first and the second batteries;
   a first zener diode, the cathode of the first zener diode being connected to the output terminal of the first battery; and
   a second zener diode, the cathode of the second zener diode being connected to the output terminal of the second battery and the anode of the second zener diode being connected to the anode of the first zener diode through a device resistant to current flow.

5. A computer system having a first and a second battery and a battery charger for the first and the second battery, each one of the first battery and the second battery having two terminals wherein a first terminal of the two terminals of each battery is at the same potential as a correponding first terminal of the other battery, further comprising: means serially inserted between output terminals of the first and the second battery including two zener diodes, the anodes of which zener diodes are connected together through a device having a resistance element.

6. A computer system having a first and a second battery and a battery charger for the first and the second battery, each one of the first battery and the second battery having two terminals wherein a first terminal of the two terminals of each battery is at the same potential as a correponding first terminal of the other battery, further comprising:
   a first zener diode, the cathode of the first zener diode being connected to the output terminal of the first battery; and
   a second zener diode, the cathode of the second zener diode being connected to the output terminal of the second battery and the anode of the second zener diode being connected to the anode of the first zener diode through a device having a resistance element.

* * * * *